United States Patent [19]

Shibata et al.

[11] Patent Number: 4,781,081
[45] Date of Patent: Nov. 1, 1988

[54] HYDRAULIC CONTROL FOR VEHICLE TRANSMISSION

[75] Inventors: Kazuhiko Shibata; Yoshinori Shibayama, both of Anjo; Kagenori Fukumura, Toyota; Seiichi Nishikawa, Toyokawa, all of Japan

[73] Assignees: Aisin-Warner Limited, Anjo; Toyota Jidosha Kabushiki Kaisha, Toyota, both of Japan

[21] Appl. No.: 820,361

[22] Filed: Jan. 21, 1986

[30] Foreign Application Priority Data

Jan. 19, 1985 [JP] Japan ................ 60-7784

[51] Int. Cl.[4] ........................... B60K 41/04
[52] U.S. Cl. ........................ 74/868; 74/867
[58] Field of Search ............ 74/868, 867, 869, 752 C

[56] References Cited

U.S. PATENT DOCUMENTS

| | | | |
|---|---|---|---|
| 4,488,457 | 12/1984 | Nishimura et al. | 74/868 |
| 4,494,640 | 1/1985 | Honig | 74/868 |
| 4,501,173 | 2/1985 | Honig | 74/868 |
| 4,501,174 | 2/1985 | Sugano | 74/868 |
| 4,597,313 | 7/1986 | Sherman | 74/868 |
| 4,616,532 | 10/1986 | Sakai et al. | 74/869 |

Primary Examiner—Leslie A. Braun
Assistant Examiner—David Novais
Attorney, Agent, or Firm—Spencer & Frank

[57] ABSTRACT

A transmission for a vehicle has a shift mechanism, a hydraulic actuator for operating the shift mechanism and a hydraulic control for supplying and discharging working oil to and from the hydraulic actuator to control the shift of the shift mechanism. The hydraulic control includes a flow regulating valve for regulating flow of the working oil supplied to the hydraulic actuator, as a function of pressure of the working oil supplied to the hydraulic actuator.

2 Claims, 7 Drawing Sheets

HYDRAULIC CONTROL FOR VEHICLE TRANSMISSION

BACKGROUND OF THE INVENTION

1. Field of the Invention

This invention relates to a control device of a transmission for a vehicle in which shift is set by a hydraulic control system.

2. Description of the Prior Art

Conventionally, in a vehicle transmission, comprising a shift mechanism which effects shifting by the operation of hydraulic actuators and a hydraulic control device for supplying working oil to the hydraulic actuators or discharging it from same to control the shift of the shift mechanism when the supply of the working oil is changed over from one hydraulic actuator to the other to effect shifting, the working oil is supplied with line pressure regulated by hydraulic pressure generated by an oil pump, a throttle opening or the like.

For example, an auxiliary transmission of a four wheel drive transmission capable of selectively providing shift stages uses a planetary gear device for the shift mechanism. An input shaft of the auxiliary transmission is connected to a sun gear of the planetary gear device. An output shaft of the auxiliary transmission is connected to a carrier of the planetary gear device. A clutch for causing a sun gear to engage and disengage from the carrier and a brake for fixing and releasing a ring gear of the planetary gear device are provided to obtain the direct stage by engaging the clutch and releasing the brake and the deceleration stage by releasing the clutch and applying the brake. The change-over of engagement and disengagement of the clutch and brake is carried out by a low-high change-over valve which changes over working oil for a hydraulic servo of a frictional engagement device for the clutch and the brake. When in a vehicle having such a four wheel drive transmission, down shift from the direct stage to the deceleration stage is effected under a certain vehicle speed, the carrier is rotated with a certain speed since it is connected to the output shaft of the four wheel drive transmission. Load applied to the sun gear is reduced by releasing the clutch, the rotational speed of the sun gear is increased and that of the ring gear is reduced by the output of a main transmission. In such prior art constructions problems have been encountered in that when the engagement of the brake is delayed, the rotational speed of the sun gear is increased (during idling of engine) since the low load condition of the output shaft of the main transmission is continued, and when the engagement of the brake occurs too soon, a peak torque is produced in the shift torque fluctuation since the rotational speed of the ring gear is forcibly made zero. To overcome these problems, it is necessary to increase the rotational speed of the sun gear by the output of engine and to supply instantaneously working oil to the brake-engaging hydraulic servo for engaging the brake when the rotational speed of the ring gear is made zero. While the low-high change-over valve is changed over and the working oil in the clutch is exhausted to start the supply of working oil to the brake, the rotational speed of the ring gear will be reduced to zero with a certain delay after the supply of working oil to the brake-engaging hydraulic servo is started, so that hydraulic pressure has been adapted to be gradually supplied to the brake-engaging hydraulic servo in the single hydraulic pressure supply characteristics.

In the above-mentioned prior art, since the hydraulic pressure supplied to the hydraulic actuator in the shift is adapted to be gradually supplied, the working oil is supplied to the brake before the rotational speed of the ring gear is made zero in the shift from the direct stage to the deceleration stage, for example, so as to forcibly stop the ring gear whereby the peak torque is produced in the shift torque fluctuation Also, even after the rotational speed of the ring gear is made zero, the problem was encountered that the ring gear was rotated in the reverse direction and the engine was destroyed since oil of insufficient pressure was supplied to the brake.

SUMMARY OF THE INVENTION

An object of this invention is to provide a hydraulic control device of a transmission for a vehicle which prevents an engine from being destroyed and reduces shift shock by regulating the pressure of working oil supplied to hydraulic actuators in the shift of the transmission for the vehicle to set the shift by changing over the supply of working oil from one hydraulic actuator to the other.

To overcome the above-discussed problems, the hydraulic control device of the transmission for a vehicle according to this invention comprises a flow regulating valve provided to regulate the flow of working oil supplied to the hydraulic actuator by the hydraulic pressure of working oil supplied to the hydraulic actuator in the vehicle transmission. The latter conventionally comprises a shift mechanism effecting shifting by the operation of the hydraulic actuator and the hydraulic control device for supplying the working oil to the hydraulic actuator and discharging the oil from the actuator to control shifting of the shift mechanism.

The hydraulic control device of the transmission for the vehicle thus constituted according to this invention can prevent engine destruction and can reduce shift shock by providing a flow regulating valve for regulating the flow and pressure of working oil supplied to hydraulic actuators in the shift of the shift mechanism for setting the shift by exhausting the working oil from one hydraulic actuator and supplying working oil to the other hydraulic actuator.

DETAILED DESCRIPTION OF THE PREFERRED EMBODIMENT

Figure 1:
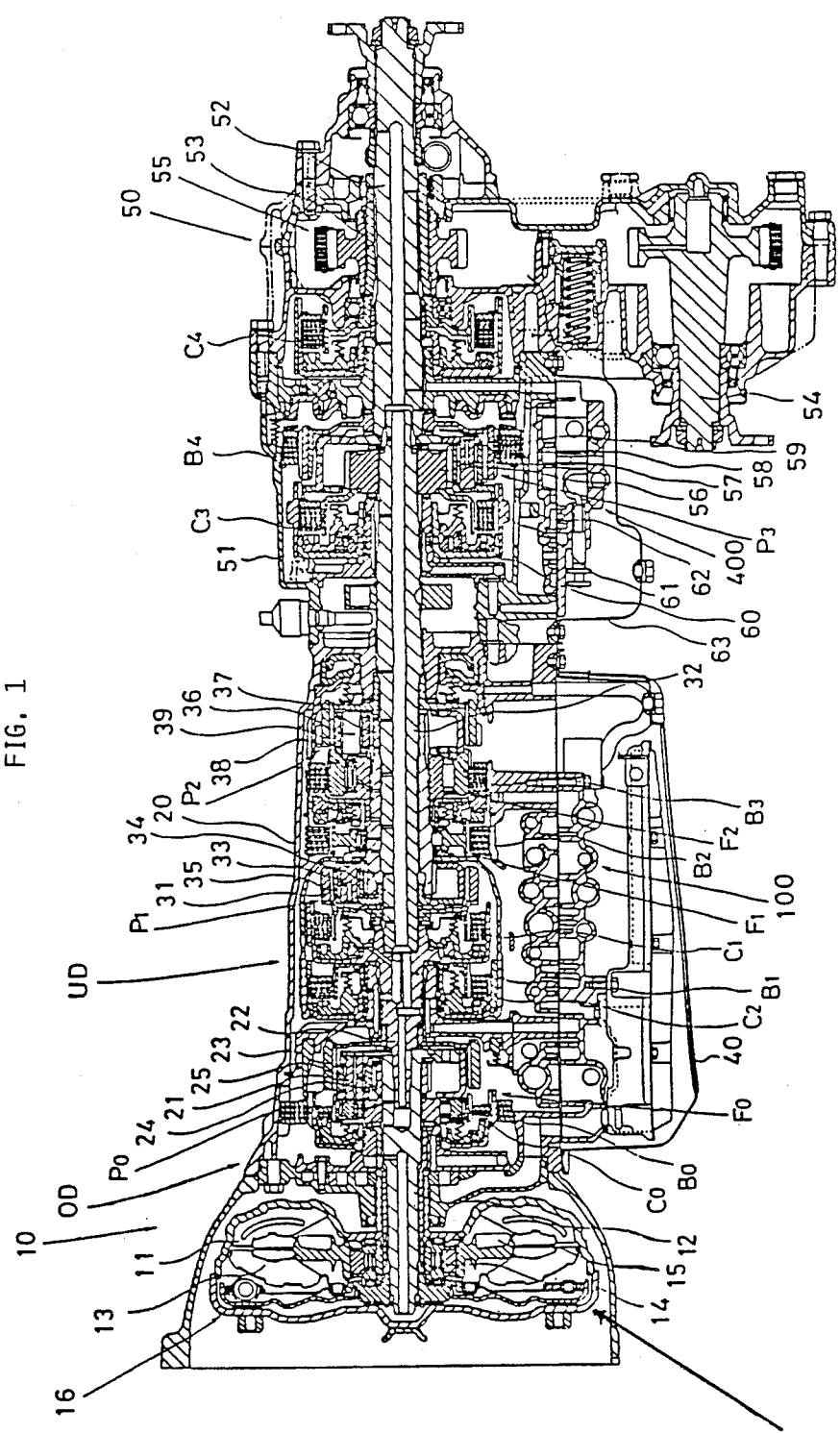
FIG. 1 is an axial sectional view of a four speed automatic transmission having four forward stages and one reverse stage and a four wheel drive auxiliary transmission, adapted to incorporate the invention.
Figure 2:
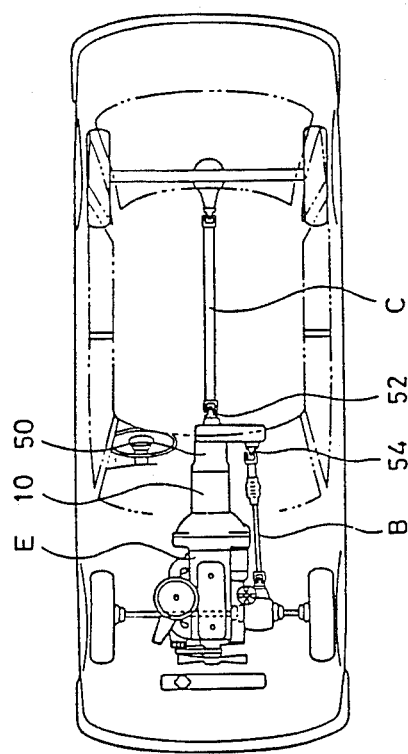
FIG. 2 is a schematic diagram showing a four wheel drive vehicle in top plan view.

Turning to FIGS. 1 and 2, there is illustrated therein an automatic vehicle transmission, including an overdrive four speed automatic transmission 10 which constitutes the main transmission. A four wheel drive auxiliary transmission 50 is fastened to the rear portion of a planetary gear shift device of the main transmission 10. The four wheel drive auxiliary transmission 50 has an input shaft which is an output shaft 32 of the main transmission 10 attached to an engine E. A first output shaft 52 is connected to a propeller shaft C for driving the rear wheels and a second output shaft 54 is connected to a propeller shaft B for driving the front wheels.

The main transmission 10 is provided with a fluid start torque converter T, an overdrive mechanism OD, and a three-stage forward/one-stage reverse underdrive mechanism UD.

The torque converter T comprises a pump impeller 11 connected to the output shaft of the engine E, a turbine 13 connected to the output shaft 12 of the torque converter T, a stator 15 connected to a fixed portion by a one-way clutch 14 and a direct clutch 16. The output shaft 12 of the torque converter T is the input shaft of the overdrive mechanism OD.

The overdrive mechanism OD comprises a multiple disk clutch C0, a multiple disk brake B1 (both are frictional engagement members), a one-way clutch F0 and a planetary gear device P0 in which these components are secured fixedly to a fixed member such as a main transmission case 20, connected to the input shaft, output shaft or other components or released from this fixation or connection by the selective engagement of these frictional engagement members.

The planetary gear device P0 comprises a carrier 21 connected to the output shaft 12, a ring gear 23 connected to the output shaft 22 of the overdrive mechanism OD, a sun gear 24 fitted rotatably onto the input shaft 12 and fixed to the main transmission case 20 by the brake B0 while connected to the carrier 21 by the clutch C0 and the one-way clutch F0 disposed parallel to the clutch C0 and a planetary pinion 25 supported rotatably by the carrier 21 while meshing with the sun gear 24 and the ring gear 23.

The output shaft 22 of the overdrive mechanism OD serves also as the input shaft of the three-stage forward-/one-stage reverse underdrive mechanism UD.

The underdrive mechanism UD comprises multiple disk clutches C1 and C2 which are frictional engagement members, a belt brake B1, multiple disk brakes B2 and B3, one-way clutches F1 and F2, a forward stage planetary gear device P1 and a reverse stage planetary gear device P2.

The forward stage planetary gear device P1 comprises a ring gear 31 connected to the output shaft 22 by the clutch C1, a carrier 33 connected to an output shaft 32 of the underdrive mechanism UD, a sun gear 34 connected to the output shaft 22 by the clutch C2 while secured fixedly to the main transmission case 20 by the belt brake B1, the brake B2 arranged parallel to the belt brake B1 and the one-way clutch F1 disposed in series to the brake B2 and a planetary pinion 35 supported rotatably by the carrier 33 while meshing with the sun gear 34 and the ring gear 31.

The reverse stage planetary gear device P2 comprises a carrier 36 secured fixedly to the main transmission case 20 by the brake B3 and the one-way clutch F2 arranged in parallel to the brake B3, a sun gear 37 formed integral with the sun gear 34 of the forward stage planetary gear device P1, a ring gear 38 connected to the output shaft 32 and a planetary pinion 39 supported rotatably by the carrier 37 while meshing with the sun gear 37 and the ring gear 38.

The main transmission 10 is installed in an oil pan 40 fastened to the lower portion of the main transmission case 20.

A main hydraulic control device 100 disposed in the lower portion of an oil strainer 101 (shown only in FIG. 3) makes selective engagement and disengagement between each clutch and brake which are frictional engagement members, according to travelling conditions of the vehicle such as the throttle opening of the engine E, the vehicle speed, etc. to perform the shift of four forward stages including overdrive (O/D) automatically and the shift of the single reverse stage only manually.

The auxiliary transmission case 51 of the auxiliary transmission 50 is fastened to the rear portion of the main transmission case 20 by a plurality of bolts to make the output shaft 32 the input shaft while the clutch C3, the brake B4 and the clutch C4 which are frictional engagement members make the output shaft 32 of the planetary gear devices P1, P2 the input shaft, and comprises a first output shaft 52 of the auxiliary transmission 50 disposed in series with the output shaft 32, a planetary gear device P3 disposed between the output shaft 32 and the first output shaft 52, a four wheel drive sleeve 53 fitted rotatably onto the first output shaft 52, a second output shaft 54 provided parallel to the output shaft 32 and mounted in the opposite direction to the first output shaft 52 and a transmission mechanism 55 between the sleeve 53 and the second output shaft 54. The planetary gear device P3 comprises a sun gear 56 splined to an end of the output shaft 32, a planetary pinion 57 meshing with the sun gear 56, a ring gear 58 meshing with the planetary pinion 57 and a carrier 59 for rotatably supporting the planetary pinion 57 while connected to an end of the first output shaft 52 of the auxiliary transmission 50. A parking gear 61 is circumferentially provided on the outer periphery side of a cylinder 60 connectively provided on the carrier 59. When a shift lever (not shown) of the main transmission 10 is placed in the parking position, a brake 62 meshes with the parking gear 61 to fix the first output shaft 52.

The auxiliary transmission 50 makes selective engagement and disengagement of each clutch and brake which are frictional engagement members, by an auxiliary hydraulic control device 400 disposed in an oil pan 63 on the lower portion of the auxiliary transmission case 51.

Figure 3:
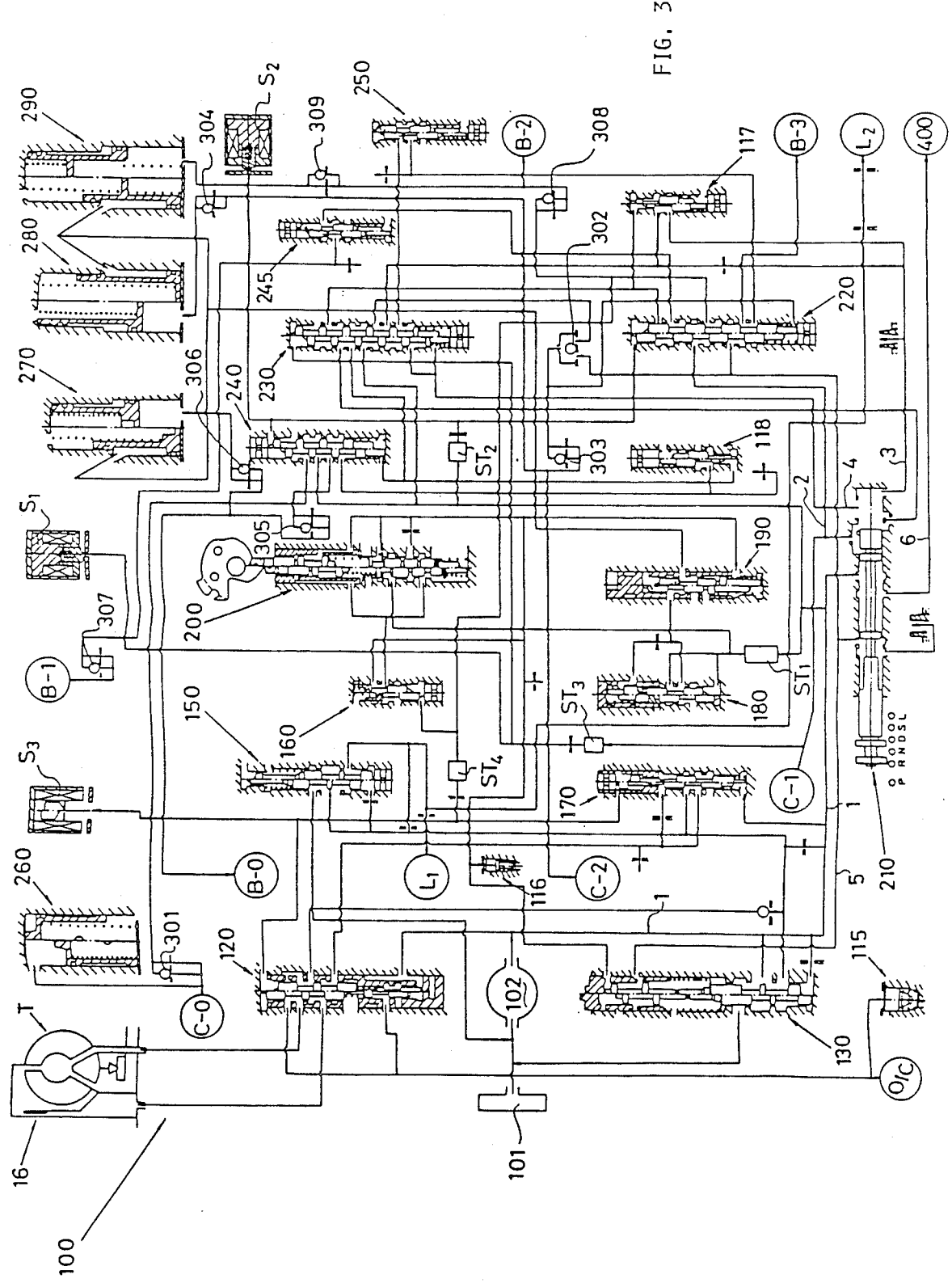
FIG. 3 is a hydraulic circuit diagram showing a hydraulic control device of a main transmission.

FIG. 3 shows a hydraulic circuit diagram of a main hydraulic control device 100 of the main transmission 10.

Figure 6:
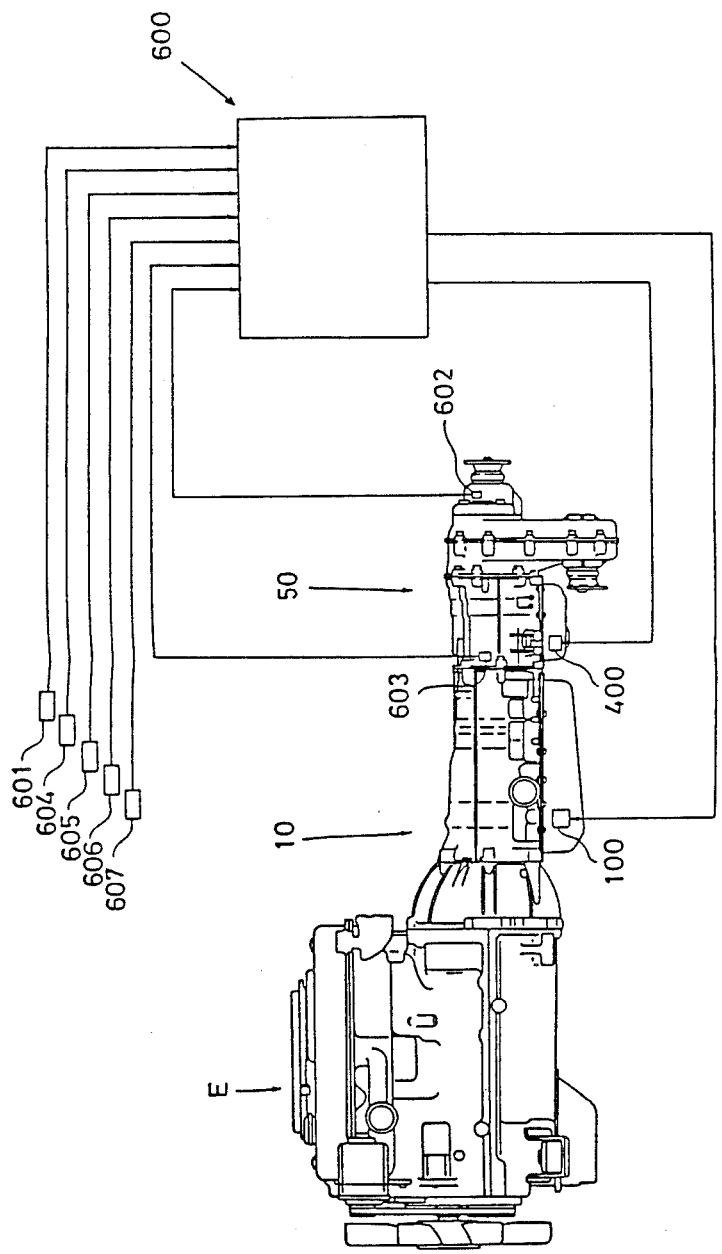
FIGS. 6 and 7 are block diagrams of an electronic control device.
Figure 7:
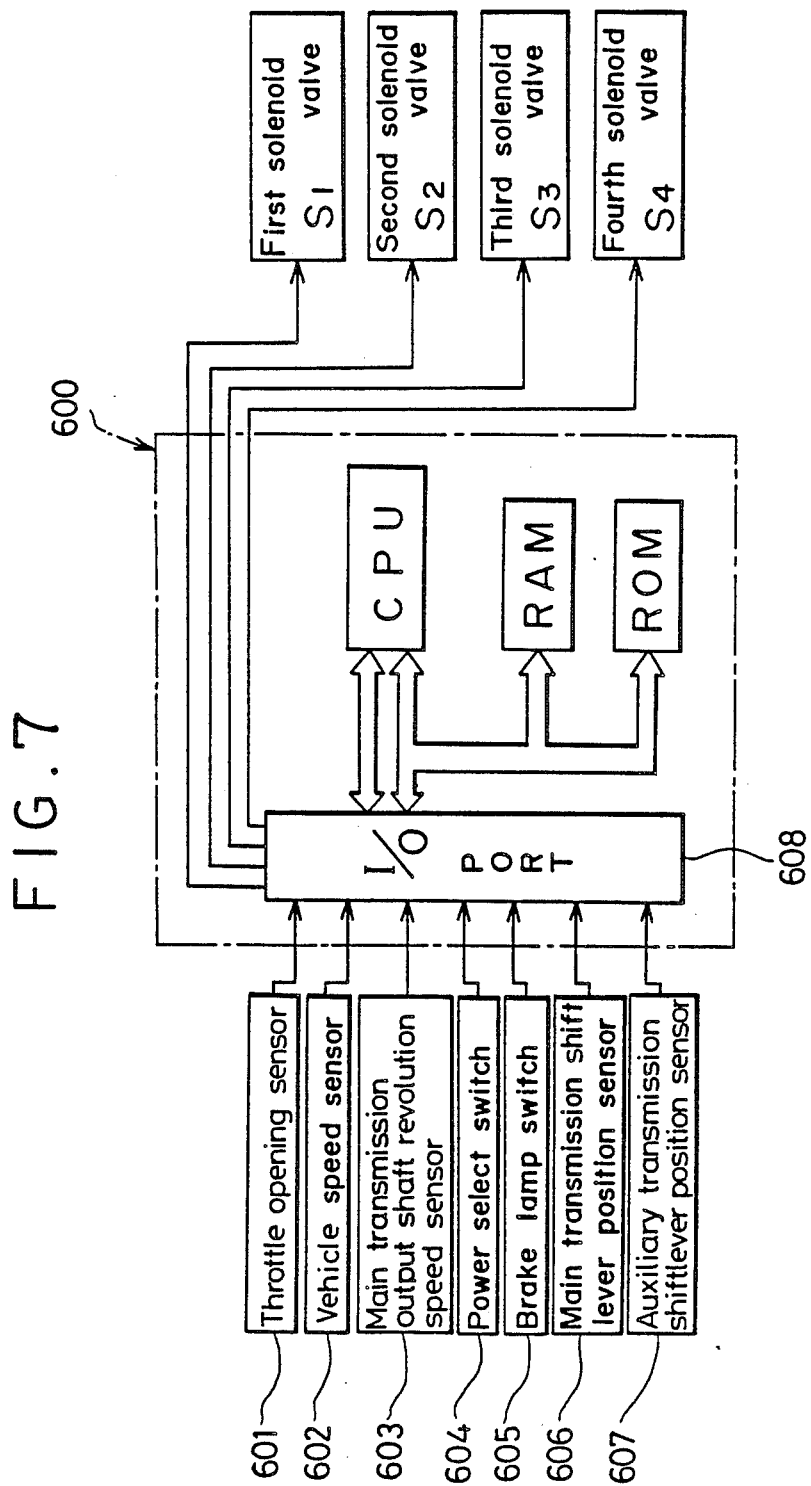

The main hydraulic control device 100 comprises an oil strainer 101 built in the oil pan 40, an oil pump 102, a cooler bypass valve 115 for regulating pressure in an oil cooler O/C, a pressure relief valve 116, a release clutch control valve 117, a release brake control valve 118, a lock-up relay valve 120, a pressure regulating valve (regulator valve) 130 for regulating the pressure of oil supplied from the oil pump 102 to send oil to an oil path 1, a second pressure regulating valve 150 for supplying oil to a lubricating oil supply oil path L1 leading to the side of the main transmission 10 and a working oil supply oil path L2 at the side of the auxiliary transmission 50, a cut-back valve 160, a lock-up control valve 170, a first accumulator control valve 180, a second accumulator control valve 190, a throttle valve 200 for generating hydraulic pressure corresponding to the opening of a throttle, a manual valve 210 for separately supplying line pressure, admitted from the oil path 1, into oil paths 2-6, a 1-2 shift valve 220, a 2-3 shift valve 230, a 3-4 shift valve 240, an intermediate coast modulator valve 245 for regulating oil pressure supplied to the brake B1, a low coast modulator valve 250 for regulating oil pressure supplied to the hydraulic servo B-3, an accumulator 260 to smooth the engagement of the clutch C0, an accumulator 270 to smooth the engagement of the brake B0, an accumulator 280 to smooth the engagement of the clutch C2, an accumulator 290 to smooth the engagement of the brake B2, hydraulic servos C-0, C-1, C-2 for the clutches C0, C1, C2 and hydraulic servos B-0, B-1, B-2, B-3 for the brakes B0, B1, B2, B3, a flow control valve 301, 303, 304, 305, 306, 307, 308, 309 with check valve for controlling the flow of pressurized oil supplied, a shuttle valve 302, oil strainers ST1, ST2, ST3, ST4, a first solenoid valve S1 opened and closed by the output of an electronic control device (computer) which will be later described with reference to FIGS. 6 and 7, to control the 2-3 shift valve 230, a second solenoid valve S2 for controlling both the 1-2 shift valve 220 and the 3-4 shift valve 240, a third solenoid valve S3 for controlling both the lock-up relay valve 120 and the lock-up control valve 170 and oil paths affording communication between the respective valves and the hydraulic cylinders of the clutches and the brakes.

A shift lever (not shown) of the main transmission 10 provided in a cab for driving the manual valve 210 has main shift positions Mp in the respective ranges of P (park), R (reverse), N (neutral), D (drive), S (second) and L (low). Table 1 shows the operational relationship between the shift stage four speed (4), three speed (3), second speed (2) and first speed (1) in the main shift position Mp setting range and the clutch and brake.

Table 2 shows the communicating condition of the oil path 1 in the shift position of the shift lever of the main transmission 10 with the oil paths 2-6.

TABLE 2

|  | P | R | N | D | S | L |
|---|---|---|---|---|---|---|
| oil path 2 | x | x | x | O | O | O |
| oil path 3 | x | x | x | x | O | O |
| oil path 4 | x | x | x | x | x | O |
| oil path 5 | x | O | x | x | x | x |
| oil path 6 | x | O | O | O | O | O |

In Table 2, O shows that line pressure is supplied under the communicating condition and X indicates that the line pressure is absent.

Figure 4:
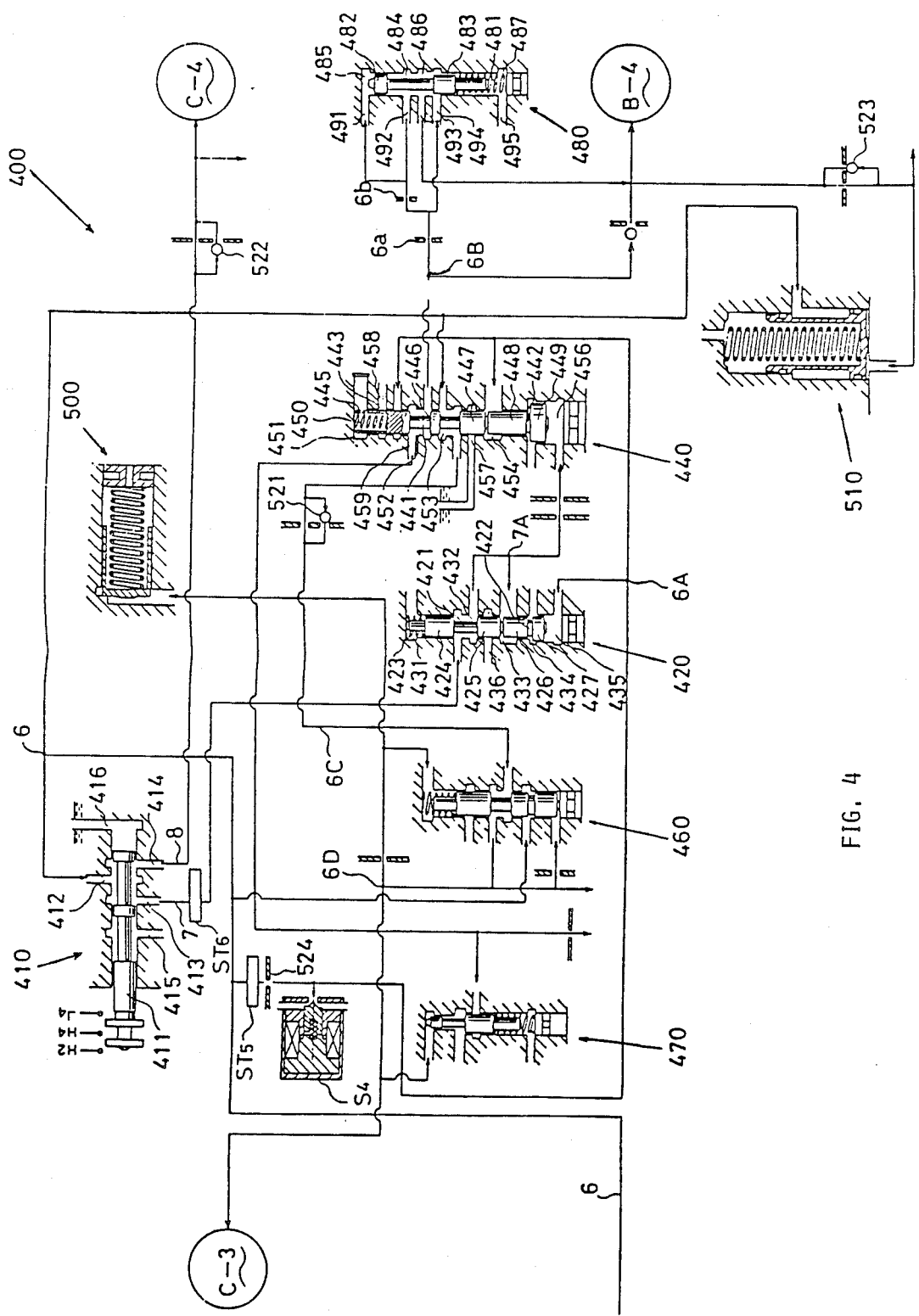
FIG. 4 is a hydraulic circuit diagram showing a hydraulic control device of an auxiliary transmission.

FIG. 4 shows a hydraulic circuit diagram of an auxiliary hydraulic control device 400 of the four wheel drive auxiliary transmission 50.

The auxiliary hydraulic control device 400 comprises a manual transfer valve 410 for supplying oil supplied through the oil path 6 of the main hydraulic control device 100 in the main transmission 10 to oil paths 7 and 8 by the shift lever provided in a cab to be manually operated, a relay valve 420, a low-high change-over valve 440 for changing over the engagement of the clutch C3 and brake B4, a third accumulator controlling valve 460, a shift timing valve 470, an orifice control valve 480 for controlling the engagement of the brake B4 according to the oil pressure supplied to the hydraulic servo B-4, an accumulator 500 to smooth the engagement of the clutch C3, an accumulator 510 to smooth the engagement of the brake B4, hydraulic servos C-3, C-4, B-4 for the clutches C3, C4 and the brake B4, flow controlling valves 521, 522, 523 with check valve for controlling the flow of pressurized oil supplied, oil strainers ST5, ST6, a fourth solenoid valve S4 opened and closed by the output of an electronic control device which will be described later with reference to FIGS. 6 and 7 and oil paths affording communication between the respective valves and hydraulic cylinders of the clutches and brakes.

The manual transfer valve 410 has a spool 411 connected to the shift lever (not shown) provided in the cab, an inport 412 communicating with the oil path 6 of the main hydraulic control device 100 in the main transmission 10, an outport 413 communicating with the oil path 7, and an outport 414 communicating with the oil path 8 and drain ports 415, 416. When the spool 411 is set to the two wheel drive direct (H2) position, the

TABLE 1

| Mp |   | S₁ | S₂ | S₃ | C₁ | C₂ | C₀ | B₁ | B₂ | B₃ | B₀ | F₁ | F₂ | F₃ |
|---|---|---|---|---|---|---|---|---|---|---|---|---|---|---|
| P |   | O | x | x | x | x | E | x | x | x | x | f | f | f |
| R |   | O | x | x | x | E | E | x | x | E | x | f | f | f |
| N |   | O | x | x | x | x | E | x | x | x | x | f | f | f |
| D | 1 | O | x | x | E | x | E | x | x | x | x | f | L | (L) |
|   | 2 | O | O | O | E | x | E | x | E | x | x | L | f | (L) |
|   | 3 | x | O | O | E | E | E | x | x | x | x | f | f | (L) |
|   | 4 | x | x | O | E | E | x | x | E | x | E | f | f | f |
| S | 1 | O | x | x | E | x | E | x | x | x | x | f | L | (L) |
|   | 2 | O | O | O | E | x | E | E | E | x | x | (L) | f | (L) |
|   | 3 | x | O | O | E | E | E | x | E | x | x | f | f | (L) |
|   | (3) | x | x | x | E | E | E | x | E | x | x | f | f | (L) |
| L | 1 | O | x | x | E | x | E | x | x | E | x | f | (L) | (L) |
|   | 2 | O | O | x | E | x | E | E | E | x | x | (L) | f | (L) |
|   | (1) | x | x | x | E | x | E | x | x | E | x | f | (L) | (L) |

In Table 1, O of S1, S2 represents current supply and X of S1, S2 represents current interruption. ⊚ of S3 represents the lock-up condition effected by current supply and X of S3 represents the condition released from the lock-up. E represents the engagement of the corresponding clutch and brake and X represents the disengagement of the corresponding clutch from the brake. L indicates that while the corresponding one-way clutch is engaged under the engine drive condition, this engagement is not always necessary since the transmission of power is ensured by the clutch or brake incorporated in series to the one-way clutch (lock). (L) indicates that the corresponding one-way clutch is engaged only under the engine drive condition and not engaged under the engine brake condition. f represents that the corresponding one-way clutch is freed.

manual transfer valve 410 affords communication between the paths 6 and 7 while affording communication between the oil path 8 and the drain port 416 and between the oil paths 6, 7 and 8 when the spool 411 is set to the four wheel drive direct (H4) position. When the spool 411 is set to the four wheel drive deceleration (L4) position, the valve 410 affords communication between the oil paths 6 and 8 and between the oil path 7 and the drain port 415.

The relay valve 420 has a spool 421 provided with lands 424 and 425 having the same diameter and being located respectively at the upper end and lower end of the spool 421 as viewed in the drawing. The spool 421 is backed by a spring 423. A plunger 422 is connected in series with the spool 421 and has a land 426 having the same diameter as that of the lands of the spool 421 and is located at the upper end of the plunger and a land 427 having a diameter larger than that of the land 426 and being located at the lower end of the plunger as viewed in the drawing. The spool 421 and the plunger 422 define an upper end oil chamber 431, a first intermediate oil chamber 432 between the upper end land 424 and the lower end land 425, a second intermediate oil chamber 433 between the spool 421 and the plunger 422, a third intermediate oil chamber 434 between the upper end land 426 and the lower end land 427 and a lower end oil chamber 435.

Figure 5:
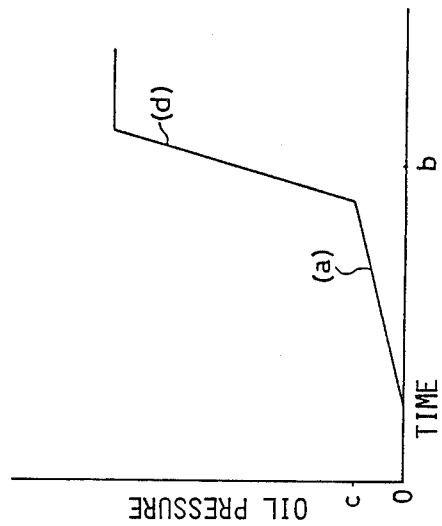
FIG. 5 is a graph showing oil pressure (ordinate) as a function of time (abscissa).

In the relay valve 420, oil pressure is supplied in an oil path 6A to the lower end oil chamber 435, and when the spool 421 and the plunger 422 are set to the upper position as viewed in the drawing, the oil path 7 communicates with a line pressure supplying oil path 7A via the first intermediate oil chamber 432, and the line pressure can be supplied to and discharged from the lower end oil chamber 456 in the low-high change-over valve 440 by switching the manual transfer valve 410. When the oil path 7 communicates with the line pressure supplying oil path 7A and the line pressure is supplied to the lower oil chamber 456 in the low-high change-over valve 440 by the manual transfer valve 410, feed-back pressure is supplied to the second intermediate oil chamber 433 so that the spool 421 is maintained in the upper position as viewed in the drawing. Then, electric current is supplied to the solenoid valve S4 by the output of the electronic control device 600 (FIGS. 5, 6, 7), and when oil pressure is removed from the lower end oil chamber 435, the plunger 422 is set to the lower position as viewed in the drawing and the spool 421 continues to be maintained in the upper position as viewed in the drawing so that the line pressure continues to be supplied to the lower end oil chamber 456 in the low-high change-over valve 440. When the line pressure in the oil path 7 is released from that condition by the manual transfer valve 410, or when the oil path 7 communicates with the line pressure supplying oil path 7A and electric current is supplied to the fourth solenoid valve S4 by the output of the electronic control device 600 (FIG. 7) to release oil pressure from the lower end oil chamber 435 while the line pressure is released from the lower end oil chamber 456 in the low-high change-over valve 440 by the manual transfer valve 410, the spool 421 and the plunger 422 are set to the lower positions as viewed in the drawing by the force of the spring 423 so that the line pressure supplying oil path 7A communicates with a drain port 426 via the first intermediate oil chamber 432. When the spool 421 is set to the lower position as viewed in the drawing, the line pressure is not supplied to and discharged from the lower end oil chamber 456 in the low-high change-over valve 440 by the manual transfer valve 410 so that the line pressure remains released and the spool 441 and the plunger 442 in the low-high change-over valve 440 are set to the lower position as viewed in the drawing.

The low-high change-over valve 440 has a first set position (lower position as viewed in the drawing) and a second set position (upper position as viewed in the drawing) and as shown in FIG. 4, the low-high change-over spool 441 which is a change-over valve for supplying and discharging the line pressure to and from the hydraulic servo C-3 of the clutch C3 and the hydraulic servo B-4 of the brake B4 by the movement from the upper position as viewed in the drawing to the first set position (the lower position in the drawing) and the second set position (the upper position in the drawing) and an inhibitor valve 442 connected in series to the low-high change-over spool 441 and having the first set position (the lower position in the drawing) and the second position (the upper position in the drawing) to set the low-high change-over spool 441 to the second set position when the inhibitor valve is urged to the second position (the upper position in the drawing). The low-high change-over spool 441 has an upper end sleeve-like land 445, a lower end land 447 and an intermediate land 446 as viewed in the drawing. The lands 445, 446 and 447 all have the same diameter. A spring means 450 urges the low-high change-over spool 441 towards the first set position. The inhibitor valve 442 has an upper end land 448 having the same diameter as that of the lands of the low-high change-over spool 441 and a lower end land 449 having a diameter larger than that of the upper end land 448 as shown in the drawing. The low-high change-over spool 441 and the inhibitor valve 442 define an upper end oil chamber 451, first and second intermediate oil chambers 452, 453 between the sleeve-like land 445 and the intermediate land 446 and the lower end land 447, an oil chamber 454 between the low-high change-over spool 441 and the inhibitor valve 442 and a lower end oil chamber 456.

In the low-high change-over valve 440, when the low-high change-over spool 441 is set to the lower position as viewed in the drawing, the upper end oil chamber 451 communicates with the oil path 6A via an oil port 443 of the sleeve-like land 445, the first intermediate oil chamber 452 affords communication between the line pressure oil path 6 and the deceleration oil path 6B, and the second intermediate oil chamber 453 affords communication between the direct oil path 6C and a drain port 457. When the low-high change-over spool 441 is set to the upper position as viewed in the drawing, the upper end oil chamber 451 communicates with a drain port 458 via the oil port 443 of the sleeve-like land 445, the first intermediate oil chamber 452 affords communication between the deceleration oil path 6B and a drain port 459, and the second intermediate oil chamber 453 affords communication between the oil path 6 and the direct oil path 6C. Also, the pressure in the oil chamber 454 continuously urges the low-high change-over spool 441 to the second set position (the upper position as viewed in the drawing), while communicating with the oil path 6A generating oil pressure corresponding to the signal of the fourth solenoid valve S4 for urging the inhibitor valve 442 to the first set position (lower position as viewed in the drawing), and the pressure in the lower end oil chamber 456 continuously urges the inhibitor valve 442 to the second set position (upper position as viewed in the drawing).

According to the invention, the auxiliary hydraulic control device 400 includes an orifice control valve 480 (flow regulating valve) which regulates the flow of working oil supplied to the hydraulic servo B-4 according to the oil pressure of working oil supplied to the hydraulic servo B-4. The orifice control valve 480 is provided with a spool 484 urged upward (as viewed in the drawing) by a spring 481 and having an upper end land 482 and a lower end land 483 as viewed from above in the drawing. The orifice control valve 480 further has an upper end oil chamber 485, an intermediate oil chamber 486 between the upper end land 482 and the lower end land 483 and a lower end oil chamber 487 accommodating a spring 481. The orifice control valve 480 is further provided with a first port 491 for receiving oil pressure supplied from above (as viewed in the drawing) to the hydraulic servo B-4, a second port 492 communicating with the oil path 6B via the orifices 6a, 6b, a third port 493 communicating with the hydraulic servo B-4, a fourth port 494 communicating with the oil path 6B via the orifice 6a and a drain port 495. Orifice 6a is larger than orifice 6b.

The upper end oil chamber 485 of the orifice control valve 480 communicates with the hydraulic servo B-4 to be controlled by oil pressure corresponding to the hydraulic servo B-4. When working oil is supplied to the oil path 6B, since the upper end oil chamber 485 together with the hydraulic servo B-4 is released from oil before the working oil is supplied to the oil path 6B, the spool 484 is located in the upper position, as viewed in the drawing, immediately after the working oil is supplied to the oil path 6B, so that the fourth port 494 is closed by the lower end land 483 and the working oil supplied to the oil path 6B is supplied gradually to the hydraulic servo B-4 through the orifices 6a, 6b, the second port 492, the intermediate oil chamber 484 and the third port 493 as shown by the straight line (a) in FIG. 5. Oil pressure supplied through the orifices 6a, 6b is set to the set pressure (the ordinate c shown in FIG. 5) immediately prior to the time (the abscissa b shown in FIG. 5) when the rotational speed of the ring gear 58 becomes zero, so that oil pressure supplied to the upper end oil chamber 485 presses the spool 484 against the position where the lower end land 483 opens the fourth port 494. Thus, as shown by the straight line (d) in FIG. 5, the working oil is abruptly supplied to the hydraulic servo B-4 through the orifice 6a, the fourth port 494, the intermediate oil chamber 486 and the third port 493, and the ring gear 58 can be forcibly stopped when the rotational speed of the ring gear 58 becomes zero so that the engine in the shift from the direct stage to the low speed stage can be prevented from destruction and the shift shock can be reduced.

The fourth solenoid valve S4 is controlled by the electronic control device 600 (FIGS. 6, 7) such that it is changed over from the non-current supply condition to the current supply condition only when the shift lever (not shown) is set to the L4 (four wheel drive deceleration) range and the vehicle travelling conditions fall within a predetermined allowance range and changed over from the current supply condition to the non-current supply condition only when the shift lever is set to the H2 (two wheel drive direct) and H4 (four wheel drive direct) ranges and the vehicle travelling conditions fall within a predetermined allowance range. The solenoid valve S4 permits high level solenoid pressure (equal to line pressure) to be generated in the oil path 6A communicating with the oil path 6 through an orifice 524 in the non-current supply condition and low level solenoid pressure to be generated by discharging pressurized oil in the oil path 6A under the current supply condition.

The shift lever of the auxiliary transmission 50 provided in the cab for driving the manual transfer valve 410 has auxiliary shift positions Sp in the respective ranges H2 (two wheel drive direct), L2 (two wheel drive deceleration), H4 (four wheel drive direct) and L4 (four wheel drive deceleration). Table 3 shows the operational relationship between the set ranges of the auxiliary shift position Sp, the engagement and disengagement of the brake B4, clutches C3 and C4 and the travelling condition of the vehicle.

TABLE 3

| Sp | S4 | C3 | B4 | C4 | travelling condition |
|---|---|---|---|---|---|
| H2 | O | x | E | x | L2 |
|    | α | E | x | x | H2 |
| H4 | O | x | E | E | L4 |
|    | α | E | x | E | H4 |
| L4 | x | E | x | E | H4 |
|    | β | x | E | E | L4 |

In Table 3, α means that the direct travelling condition is maintained when S4 is insulated from electric current even if the current is supplied to S4, and β means that the deceleration travelling condition is maintained by one time of current supply to S4 even if S4 is insulated from current. E represents the engagement of the corresponding clutches and brakes and X represents the disengagement of the corresponding clutches and brakes.

Table 4 shows the communicating condition of the oil path 6 with the oil paths 7 and 8 in the shift position of the auxiliary transmission.

TABLE 4

|  | H2 | H4 | L4 |
|---|---|---|---|
| oil path 7 | O | O | x |
| oil path 8 | x | O | O |

In Table 4, O represents the line pressure supplied under the communicating condition and X represents the condition of removed pressure.

The operation of the auxiliary transmission 50 in the respective set ranges will be described next.

(Situation A): The manual transfer valve 410 is set to the H2 range.

As shown in Table 4, line pressure is supplied to the oil path 7 and pressure is removed from the oil path 8. Hence, the clutch C4 is disengaged by the pressure removal of the hydraulic servo C-4 and power is not transmitted to the sleeve 53 so that the two wheel drive condition is provided.

When current is not supplied to the fourth solenoid valve S4 by the output of the electronic control device 600 (FIGS. 6, 7), high level solenoid pressure is supplied to the lower end oil chamber 435 in the relay valve 420 so that the spool 421 and the plunger 422 are set to the upper position as viewed in the drawing, the oil path 7 communicates with the line pressure supplying oil path 7A via the relay valve 420 and line pressure signals are supplied to the lower end oil chamber 456 in the low-high change-over valve 440. Thus, the low-high change-over spool 441 and the inhibitor valve 442 in the low-high change-over valve 440 are set to the second set position (the upper position as viewed in the drawing), the oil path 6B communicates with the drain port 459 to release pressure and the hydraulic servo B-4 releases pressure to release the brake B4. The oil path 6C communicates with the oil path 6 since the low-high change-over spool 441 and the inhibitor valve 442 in the low-high change-over valve 440 are set to the second set position (the upper one as viewed in the drawing). The oil path 6C further communicates with the oil path 6D via the third accumulator controlling valve 460 so that line pressure is supplied to the hydraulic servo C-3 to cause the clutch C3 to engage. Thus, the auxiliary transmission 50 is set to H2 (two wheel drive direct condition).

Then, since feed-back pressure is supplied from the line pressure supplying oil path 7A to the second intermediate oil chamber 433 of the relay valve 420, the spool 421 is maintained in the upper position shown in the drawing and even if current is supplied to the fourth solenoid valve S4 to supply low level solenoid pressure to the lower end oil chamber 435, only the plunger 422 is set to the lower position shown in the drawing and the spool 421 is maintained in the upper position as viewed in the drawing so that the line pressure signal is supplied to the lower end oil chamber 456 in the low-high change-over valve 440. Thus, the auxiliary transmission 50 maintains H2 (two wheel drive direct condition) even if current is supplied to the solenoid valve S4.

(Situation B): The manual transfer valve 410 is set to the H4 range.

As shown in Table 4, the line pressure is supplied to both the oil path 7 and the oil path 8.

When current is not supplied to the fourth solenoid valve S4 by the output of the electronic control device 600 (FIGS. 6, 7), high level solenoid pressure is supplied to the lower end oil chamber 435 of the relay valve 420 so that the spool 421 and the plunger 422 are set to the upper position as viewed in the drawing, the oil path 7 communicates with the line pressure supplying oil path 7A, and the line pressure is supplied to the lower end oil chamber 456 in the low-high change-over valve 440. Thus, the low-high change-over spool 441 and the inhibitor valve 442 in the low-high change-over valve 440 are set to the second set position (the upper position as viewed in the drawing) so that the oil path 6B communicates with the drain port 459 to release pressure and the hydraulic servo B-4 is released from the pressure to release the brake B4. Since the low-high change-over spool 441 and the inhibitor valve 442 in the low-high change-over valve 440 are set to the second set position (the upper position viewed in the drawing), the oil path 6C communicates with the oil path 6 and the oil path 6D via the third accumulator controlling valve 460 to supply the line pressure to the hydraulic servo C-3 for engaging the clutch C3. Also, the line pressure supplied to the oil path 8 is supplied to the hydraulic servo C-4 to engage the clutch C4. Thus, the auxiliary transmission 50 is set to H4 (four wheel drive direct condition).

Since then feed-back pressure is supplied from the line pressure supplying oil path 7A to the second intermediate oil chamber 433 of the relay valve 420, the spool 421 is fixed to the upper position as viewed in the drawing and current is supplied to the fourth solenoid valve S4 so that only the plunger 422 is set to the lower position as viewed in the drawing. The spool 421 is set to the upper position as viewed in the drawing even if the low level solenoid pressure is supplied to the lower end oil chamber 435, and remains in the upper position as viewed in the drawing to supply the line pressure to the lower end oil chamber 456 in the low-high change-over valve 440 and maintain the auxiliary transmission 50 at H4 (four wheel drive direct condition).

(Situation C): The manual transfer valve 410 is set to the L4 range.

As shown in Table 4, the oil path 7 is released from pressure and the oil path 8 is supplied with the line pressure. Thus, the oil paths 7, 7A are released from pressure irrespective of the setting of the relay valve 420 and the oil path 8 is supplied with the line pressure so that the clutch C4 is engaged to maintain the four wheel drive condition.

When the fourth solenoid valve S4 is set to the L4 range from high speed stage (H2, H4) and is not supplied with current by the output of the electronic control device 600 (FIGS. 6, 7), the high level solenoid pressure is supplied from the oil path 6A to the oil chamber 454 of the low-high change-over valve 440, and the line pressure supplied to the lower end oil chamber 456 is released via the oil path 7A, relay valve 420, oil path 7 and manual transfer valve 410 so that the inhibitor valve 442 of the low-high change-over valve 440 is set to the first set position (the lower position as viewed in the drawing) by the line pressure applied to the oil chamber 454. However, the low-high change-over spool 441 of the low-high change-over valve 440 is left set to the second set position (the upper one as viewed in the drawing) and set to H4 (four wheel drive direct condition).

When the manual transfer valve 410 is set to L4 and current is supplied to the fourth solenoid valve S4 by the output of the electronic control device 600 (FIGS. 6, 7), or when the manual transfer valve 410 is set to L4 and the fourth solenoid valve S4 is switched from the non-current supply to the current supply condition, the oil path 6A has the low level solenoid pressure so that the low-high change-over spool 441 of the low-high change-over valve 440 is set to the first set position (the lower position as viewed in the drawing) by the action of the spring 450. Thus, the oil path 6 communicates with the oil path 6B via the low-high change-over valve 440 and the line pressure is supplied to the hydraulic servo B-4 of the brake B4 through the orifices 6a, 6b of the orifice control valve 480. The oil path 6C communicates with the drain port 457 via the first intermediate oil chamber 452 of the low-high change-over valve 440 to be released from pressure and oil pressure is released from the hydraulic servo C-3 of the clutch C3. Thus, the auxiliary transmission 50 is set to L4 (four wheel drive deceleration condition). When the auxiliary transmission 50 is set to L4 (four wheel drive deceleration condition) and the oil path 6A has the high level solenoid pressure even if current is not supplied to the fourth solenoid valve S4, the high level solenoid pressure is applied to the oil chamber 454 in the low-high change-over valve 440, while it is applied to the upper end oil chamber 451 through the oil port 443 of the sleeve-like land 445 in the low-high change-over spool 441, so that L4 (four wheel drive deceleration condition) is maintained without the displacement of the low-high change-over spool 441.

(Situation D): The auxiliary transmission 50 is set to the four wheel drive deceleration condition and the manual transfer valve 410 is set from the L4 range to the H2 or H4 range.

When current is supplied to the fourth solenoid vale S4 by the output of the electronic control device 600 (FIGS. 6, 7), oil pressure is released from the lower end oil chamber 435 in the relay valve 420. Since the spool 421 and the plunger 422 are set to the lower position (as viewed in the drawing) by the force of the spring 423, the oil paths 7, 7A do not communicate with the upper end land 424 and the lower end oil chamber 456 in the low-high change-over valve 440 is released from pressure, so that the low-high change-over spool 441 and the inhibitor valve 442 in the low-high change-over valve 440 are set to the lower position (as viewed in the drawing) by the force of the spring 450. The clutch C3 is released and the brake B4 is engaged so that the auxiliary transmission 50 is set to L2 (two wheel drive deceleration condition) or L4 (four wheel drive deceleration condition). However, since current is not supplied to the fourth solenoid valve S4 by the output of the electronic control device 600 (FIGS. 6, 7), the high level solenoid pressure is supplied to the lower end oil chamber 435 in the relay valve 420 as above described, so that the spool 421 and the inhibitor valve 422 are set to the upper position as viewed in the drawing, the oil path 7 communicates with the line pressure supplying oil path 7A, the line pressure is supplied to the lower end oil chamber 456 in the low-high change-over valve 440 and the low-high change-over spool 441 and the inhibitor valve 442 are set to the second set position (the upper position as viewed in the drawing). Thus, the oil path 6B communicates with the drain port 459 to release pressure so that the brake B4 is released. Since the low-high change-over spool 441 and the inhibitor valve 442 in the low-high change-over valve 440 are set to the second set position (the upper position as viewed in the drawing), the oil path 6C communicates with the oil path 6 and the oil path 6D via the third accumulator control valve 460 to engage the clutch C3 and set the auxiliary transmission 50 to H2 (two wheel drive direct) or H4 (four wheel drive direct).

In the description which follows the electronic control device 600 for shift control of the four wheel drive automatic transmission will be set forth with reference to the block diagram shown in FIGS. 6 and 7.

The electronic control device 600 for controlling the current supply to the solenoid valves S1-S4 of the main hydraulic control device 100 and the auxiliary hydraulic control device 400 comprises a throttle opening sensor 601 for detecting the magnitude of acceleration, a vehicle speed sensor 602 for converting signals detected from the rotational speed of the output shaft of the auxiliary transmission 50 to vehicle speed, a rotational speed sensor 603 of the main transmission output shaft for detecting the rotational speed of the output shaft 32 of the main transmission 10 which is the input shaft of the auxiliary transmission 50, a power selection switch 604 for changing over and setting the shift pattern such as economy, normal, power, etc. for example, by driver's selection, a brake lamp switch 605, a main transmission shift lever position sensor 606 for detecting the set range position (Mp) of the main transmission 10, an auxiliary transmission shift lever position sensor 607 for detecting the set range position (Sp) of the auxiliary transmission 50, an I/O port 608 which is the input port for the noted vehicle travelling conditions and also the output port to the solenoid valves S1-S4, a central computation process unit CPU, a random access memory RAM for processing shift point and a read-only-memory ROM storing data of shift pattern such as shift point, lock-up point, etc.

It will be understood that the above description of the present invention is susceptible to various modifications, changes and adaptations, and the same are intended to be comprehended within the meaning and range of equivalents of the appended claims.

What is claimed is:

1. A control device of a transmission for a vehicle comprising:
    a shift mechanism connected between a first and a second hydraulic servo of the transmission to supply a line pressure to the first hydraulic servo and to discharge a line pressure to the second hydraulic servo,
    an orifice control means provided between the shift mechanism and the first hydraulic servo for supplying a line pressure to the first hydraulic servo,
    a first passage having an orifice provided between the shift mechanism and the orifice control means to supply a line pressure in the first passage to the first hydraulic servo through said orifice control means,
    a second passage provided between the shift mechanism and the orifice control means to supply a line pressure thereto through the orifice control means, and
    a third passage provided between the orifice control means and the first hydraulic servo to supply a line pressure thereto through the orifice control means, said orifice control means having
    a spool,
    a spring,
    a first and a second port connected to the first passage,
    a third port connected to the second passage, and
    a fourth port connected to the third passage, whereby the first passage is connected to the third passage when an oil pressure between the orifice and the first port in the first passage is lower than a set pressure and the second passage is connected to the third passage when the oil pressure between the orifice and the first port in the first passage is higher than the set pressure.

2. A control device of a transmission for a vehicle comprising:
    a shift mechanism connected between a first and a second hydraulic servo of the transmission to supply a line pressure to the first hydraulic servo and to discharge a line pressure to the second hydraulic servo,
    an orifice control means provided between the shift mechanism and the first hydraulic servo for supplying a line pressure to the first hydraulic servo,
    a first passage having an orifice provided between the shift mechanism and the orifice control means to supply a line pressure in the first passage with the orifice to the first hydraulic servo through said orifice control means when a line pressure is supplied to the first passage, and
    a second passage connected to the orifice control means to supply a line pressure in the second passage to the first hydraulic servo through the orifice control means when a line pressure in the first passage with the orifice is supplied to the orifice control means to connect the second passage to the first hydraulic servo;
    said orifice control means having a spool,
a spring,
a first and a second port connected to the first passage,
a third port connected to the first hydraulic servo and
a fourth port connected to the second passage,
the first passage being connected to the third port to supply a line pressure to the first hydraulic servo through the orifice control means when a line pressure is supplied to the first passage,
the second passage being connected to the third port to supply a line pressure to the first hydraulic servo when a line pressure in the first passage is supplied to the first port to connect the fourth port to the third port supplying a line pressure in the second passage to the first hydraulic servo.

* * * * *